(12) United States Patent
Itoh

(10) Patent No.: US 10,611,190 B2
(45) Date of Patent: Apr. 7, 2020

(54) TIRE

(71) Applicant: BRIDGESTONE CORPORATION, Chuo-ku, Tokyo (JP)

(72) Inventor: Yuki Itoh, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/515,135

(22) PCT Filed: Sep. 29, 2015

(86) PCT No.: PCT/JP2015/077612
§ 371 (c)(1),
(2) Date: Mar. 28, 2017

(87) PCT Pub. No.: WO2016/052564
PCT Pub. Date: Apr. 7, 2016

(65) Prior Publication Data
US 2017/0232796 A1 Aug. 17, 2017

(30) Foreign Application Priority Data
Sep. 29, 2014 (JP) .................................. 2014-199160

(51) Int. Cl.
*B60C 1/00* (2006.01)
*B60C 5/00* (2006.01)
(Continued)

(52) U.S. Cl.
CPC .............. *B60C 5/007* (2013.01); *B60C 1/00* (2013.01); *B60C 5/01* (2013.01); *C08G 69/14* (2013.01);
(Continued)

(58) Field of Classification Search
CPC ...................................................... B60C 5/007
See application file for complete search history.

(56) References Cited

U.S. PATENT DOCUMENTS

| 2013/0203889 A1 | 8/2013 | Lopitaux et al. |
| 2013/0206301 A1 | 8/2013 | Fudemoto et al. |

(Continued)

FOREIGN PATENT DOCUMENTS

| CN | 103189215 A | 7/2013 |
| JP | S61-293223 A | 12/1986 |

(Continued)

OTHER PUBLICATIONS

Extended European Search Report dated Jul. 6, 2017, issued in corresponding EP Patent Application EP 15847908.9.

(Continued)

*Primary Examiner* — Peter F Godenschwager
(74) *Attorney, Agent, or Firm* — SOLARIS Intellectual Property Group, PLLC

(57) ABSTRACT

There is provided a tire comprising a tire frame that is formed of a resin material and has a circular form, wherein the resin material comprises a thermoplastic elastomer having a structure including a hard segment (HS) and a soft segment (SS), which repeat alternately, in which a number of repeating units in one molecular chain is from 2 to 10, each of the repeating units being a pair of the hard segment (HS) and the soft segment (SS), the thermoplastic elastomer having a number average molecular weight of from 45,000 to 160,000.

10 Claims, 3 Drawing Sheets

(51) Int. Cl.
  *B60C 5/01* (2006.01)
  *B29D 30/08* (2006.01)
  *C08G 69/14* (2006.01)
  *C08G 69/36* (2006.01)
  *C08G 69/40* (2006.01)
  *C08L 21/00* (2006.01)

(52) U.S. Cl.
  CPC .............. *C08G 69/36* (2013.01); *C08G 69/40* (2013.01); *C08L 21/00* (2013.01); *B29D 30/08* (2013.01); *C08G 2380/00* (2013.01)

(56) References Cited

U.S. PATENT DOCUMENTS

| | | |
|---|---|---|
| 2014/0124114 A1 | 5/2014 | Hayashi et al. |
| 2016/0023515 A1 | 1/2016 | Fudemoto et al. |
| 2016/0303905 A1 | 10/2016 | Fudemoto et al. |

FOREIGN PATENT DOCUMENTS

| | | |
|---|---|---|
| JP | H04-91128 A | 3/1992 |
| JP | 2012-045790 A | 3/2012 |
| JP | 2012-046030 A | 3/2012 |
| JP | 2013-521360 A | 6/2013 |
| JP | 2014-037551 A | 2/2014 |

OTHER PUBLICATIONS

International Search Report issued in International Application No. PCT/JP2015/077612 dated Dec. 28, 2015.
Search Report of the Chinese office action dated Sep. 28, 2018, from the SIPO in a Chinese patent application corresponding to the instant patent application.

TIRE

TECHNICAL FIELD

The present invention relates to a tire that is mounted on a rim, in particular, a tire in which at least a portion of a tire case is formed of a resin material.

BACKGROUND ART

Pneumatic tires composed of, for example, rubber, an organic fiber material and a steel member have been used for vehicles such as passenger cars.

Use of resin materials, particularly thermoplastic resins and thermoplastic elastomers, in tire materials, has been studied in recent years, considering that the resins have light weights, high shapability, and high recyclability. These thermoplastic polymer materials (thermoplastic elastomer, thermoplastic resin materials and the like) have a lot of advantages from the viewpoint of improving productivity, such as being injection moldable. For example, Japanese Patent Application Laid-Open (JP-A) No. 2012-46030 proposes a tire produced using a polyamide-based thermoplastic elastomer as a thermoplastic polymer material.

SUMMARY OF INVENTION

Technical Problem

A tire produced using a thermoplastic polymer material can be easily produced and less expensive, compared to conventional rubber tires. However, there is room for improvement from the viewpoint of low rolling resistance (low loss property), compared to conventional rubber tires. Furthermore, in a case in which a tire is produced using a thermoplastic elastomer, realizing performance that is comparable to that of conventional rubber tires is requested, while production efficiency is increased and a lowering the cost is realized.

Furthermore, for the performance of a tire produced using a thermoplastic elastomer, it is requested that the elastic modulus and the low loss property are both excellent and well-balanced, without impairing durability.

In view of such circumstances, an object of the invention is to provide a tire which is formed using a resin material and achieves both a desirable elastic modulus and an excellent low loss property while having durability.

Solution to Problem

[1] A tire comprising a tire frame that is formed of a resin material and has a circular form, wherein the resin material comprises a thermoplastic elastomer having a structure including a hard segment (HS) and a soft segment (SS), which repeat alternately, in which a number of repeating units in one molecular chain is from 2 to 10, each of the repeating units being a pair of the hard segment (HS) and the soft segment (SS), the thermoplastic elastomer having a number average molecular weight of from 45,000 to 160,000.

Advantageous Effects of Invention

According to the invention, a tire which is formed using a resin material and achieves both a desirable elastic modulus and an excellent low loss property while having durability can be provided.

DESCRIPTION OF EMBODIMENTS

Figure 1A:
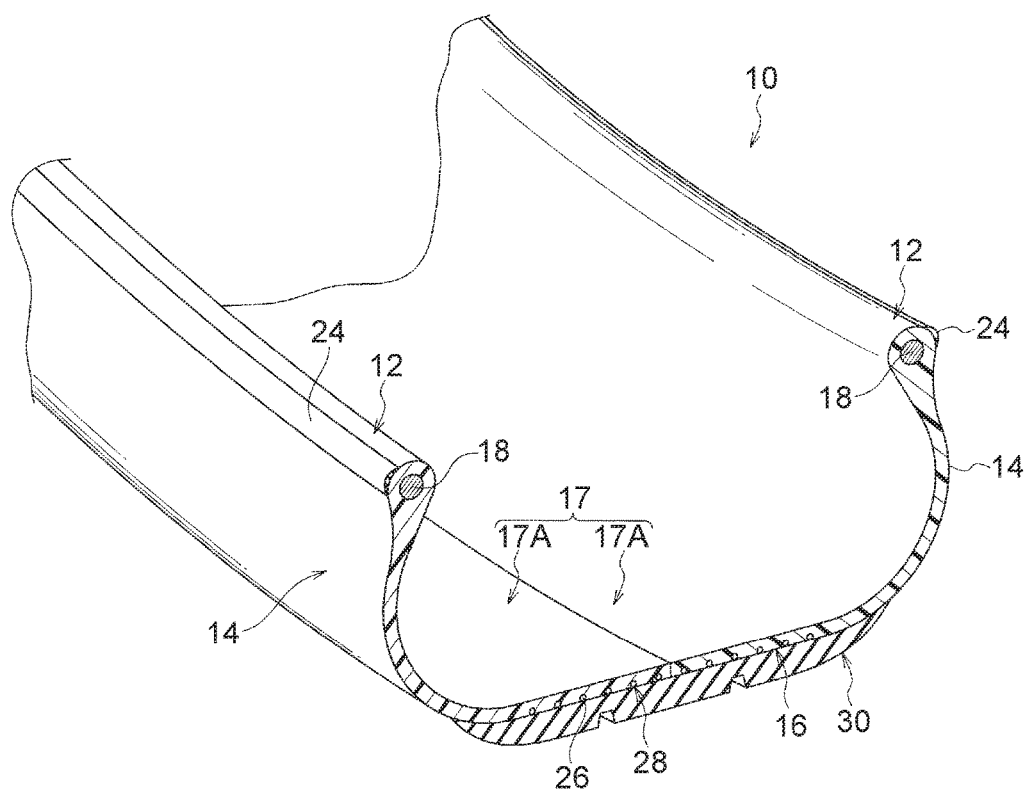
FIG. 1A is a perspective view illustrating a partial cross-section of a tire according to one embodiment of the invention.

The tire according to the invention has an a tire frame formed of a resin material (that is, formed using at least a resin material) and has a circular form. The resin material includes a thermoplastic elastomer having a structure including a hard segment (HS) and a soft segment (SS), which repeat alternately, in which a number of repeating units in one molecular chain is from 2 to 10, each of the repeating units being a pair of the hard segment (HS) and the soft segment (SS), the thermoplastic elastomer having a number average molecular weight of from 45,000 to 160,000.

Here, the number of repeating units in one molecule, each of the repeating units being a pair of the hard segment (HS) and the soft segment (SS) refers to the number of pairs repeating in one molecular chain of a thermoplastic elastomer having a structure including a hard segment (HS) and a soft segment (SS), which repeat alternately, "one unit" of the pairs being a pair of one hard segment (HS) and one soft segment (SS).

The number of repeating units refers to an average value of the repeating units in the thermoplastic elastomer included in the resin material.

In regard to the tire according to the invention, since the thermoplastic elastomer included in the resin material has a hard segment and a soft segment, properties exhibited by these segments can be obtained. Furthermore, since the number average molecular weight of the thermoplastic elastomer is in the range of from 45,000 to 160,000, excellent rim fittability and productivity can be obtained, and durability can also be obtained.

Meanwhile, there are occasions in which the properties exhibited by the respective segments may not be sufficiently obtained as expected, due to the regions in which hard segments and soft segments are mixed (hereinafter, referred to as "intermediate phase"), which exist at the interface of these segments.

In view of the above, the tire according to the invention includes a thermoplastic elastomer having a number average molecular weight in the range described above, the thermoplastic elastomer having a structure including a hard segment (HS) and a soft segment (SS), which repeat alternately, in which the number of repeating units in one molecular chain is from 2 to 10, each of the repeating units being a pair of the hard segment (HS) and the soft segment (SS). By the above configuration, the length of one hard segment (HS) becomes longer compared to the case in which only a thermoplastic elastomer having the same overall molecular weight and having a number of the aforementioned repeating units of more than 10 is included. Thus, compatibility between the hard segment (HS) and the soft segment (SS) is decreased, and the intermediate phase in which HS and SS are intermingled can be reduced. As a result, the degree of crystallinity of HS, which affects the elastic modulus, increases, whereby the elastic modulus is improved, and the loss can also be decreased.

As a result, both a desirable elastic modulus and excellent low loss property can be achieved.

<<Resin Material>>

<Thermoplastic Elastomer>

A thermoplastic elastomer that is used as the resin material has a structure including a hard segment (HS) and a soft segment (SS), which repeat alternately. Furthermore, the number of repeating units in one molecular chain is from 2 to 10, each of the repeating units being a pair of the hard segment (HS) and the soft segment (SS), and the number average molecular weight is from 45,000 to 160,000.

The resin material may also include a thermoplastic elastomer other than the thermoplastic elastomer described above, or optional components. The term "resin" according to the present specification is a concept including a thermoplastic resin and a thermosetting resin; however, the resin does not include natural rubber.

The thermoplastic elastomer may have a linking section between a hard segment (HS) and a soft segment (SS). The "linking section" according to the present specification is a linking section that links two or more segments, namely, a linking section between a hard segment and a soft segment. The linking section may be, for example, a portion linked using a chain extending agent that will be described later.

—Number of Repeating Units of HS and SS—

The number of the repeating units described above in the thermoplastic elastomer is adjusted to be from 2 to 10. If the number of repeating units is more than 10, the length of one hard segment (HS) becomes relatively shorter in a case in which the overall molecular weight is the same, in which case it is difficult to control the elastic modulus to a desirable range, and the loss is also increased. On the other hand, if the number of repeating units is less than 2, elastomeric properties are deteriorated, the required rubber elasticity may not be obtained, and the elasticity or elongation property required for a tire may not be obtained.

The number of the repeating units in the thermoplastic elastomer is preferably 2 or more, and more preferably 3 or more, as the lower limit. The upper limit is preferably 8 or less, and more preferably 6 or less.

Calculation Method

The number of repeating units (average value) each composed of a pair of a hard segment (HS) and a soft segment (SS) can be calculated by measuring the average molecular weight of the thermoplastic elastomer, the respective average molecular weights of the hard segment (HS) and the soft segment (SS), or the like by NMR.

For example, in a case in which the thermoplastic elastomer is composed of one kind of hard segment (HS) and one kind of soft segment (SS) only, any one of the following equations (1) to (3) will be established.

(1) Average molecular weight of thermoplastic elastomer=Average molecular weight of HS×$X$+ average molecular weight of SS×$X$ (2) Average molecular weight of thermoplastic elastomer=Average molecular weight of HS×$X$+ average molecular weight of SS×($X$−1)

(3) Average molecular weight of thermoplastic elastomer=Average molecular weight of HS×$X$+ average molecular weight of SS×($X$+1)

wherein $X$ in Formulae (1) to (3) represents an integer of 1 or more.

Then, the value of X in the established formula is calculated, whereby the number of repeating units of HS and SS (average value) is calculated.

The thermoplastic elastomer may contain a linking section. In other word, the "repeating unit", one unit of which refers to a pair of one hard segment (HS) and one soft segment (SS), may be in a form in which a HS is linked to an SS via a linking section, Even in a case in which the thermoplastic elastomer contains a linking section in addition to the hard segment (HS) and the soft segment (SS), the numbers (average values) of repeating units of HS and SS can be calculated by measuring the average molecular weight of the thermoplastic elastomer or the respective average molecular weights of the hard segment (HS), the soft segment (SS) and the linking section, by NMR as described above.

Here, the method of measuring the average molecular weights of a thermoplastic elastomer, a hard segment (HS), a soft segment (SS), a linking section and the like by NMR will be explained.

A thermoplastic elastomer to be measured is dissolved in deuterated trifluoroacetic acid, and measurement by $^1$H-NMR and $^{13}$C-NMR is performed according to usual methods. Next, assignment of the respective functional groups is implemented, the structures of HS, SS and the linking section are identified, and the molecular weights are determined. A value obtained by adding up the molecular weights of the respective sites corresponds to the average molecular weight per repeating unit.

Method for Attaining

Control of the number of repeating units of HS and SS may be carried out by adjusting the molecular weight of a hard segment (HS) and a molecular weight of the soft segment (SS) in one unit such that the number average molecular weight and the number of repeating units in one molecule in the thermoplastic elastomer will have intended values. Adjustment of the degree of polymerization of these HS and SS (that is, the number of polymerization sites) or the like may also be adopted.

—Molecular Weight—

The number average molecular weight of the thermoplastic elastomer is in the range of from 45,000 to 160,000. If the number average molecular weight is less than 45,000, rim fittability is deteriorated. On the other hand, if the number average molecular weight is more than 160,000, melt viscosity becomes high, and there is a possibility that insufficient filling may occur at the time of filling the tire frame. Therefore, increase in the molding temperature and the mold temperature is required. For this reason, the cycling time is prolonged, and therefore, productivity is lowered.

The number average molecular weight of the thermoplastic elastomer is more preferably from 80,000 to 160,000, and still more preferably from 100,000 to 160,000.

In order to adjust the number average molecular weight to the range described above, a method of respectively adjusting the molecular weights of the hard segment (HS) and the soft segment (SS) (in a case in which the thermoplastic elastomer has a linking section, a method of adjusting the molecular weight of the linking section as well), a method of adjusting the degree of polymerization, and the like may be adopted.

The number average molecular weight of the thermoplastic elastomer may be measured by gel permeation chromatography (GPC), and for example, GPC (gel permeation chromatography) such as "HLC-8320GPC EcoSEC" manufactured by Tosoh Corp. or the like may be used.

—HS/SS Ratio—

In regard to the thermoplastic elastomer, the average value of the mass ratio (HS/SS) of the hard segment (HS) to the soft segment (SS) in a repeating unit (that is, one unit, which is a pair of one hard segment (HS) and one soft segment (SS)) is preferably from 20/80 to 90/10. Furthermore, the mass ratio is more preferably from 20/80 to 80/20, still more preferably from 30/70 to 80/20, and still more preferably from 40/60 to 75/25.

When the average mass ratio of HS in the repeating unit is 20 or more (in other word, when the average mass ratio of SS is 80 or less), rigidity required for a tire can be imparted. On the other hand, when the average mass ratio of HS in the repeating unit is 90 or less (that is, the average mass ratio of SS is 10 or more), rim fittability can be secured by including a certain amount of SS.

In a case in which the thermoplastic elastomer has a linking section, that is, in a case in which a chain extending agent is used, it is preferable that the content of the chain extending agent is adjusted such that the hydroxyl group or amino group of the monomer that serves as a raw material of the soft segment and the carboxyl group of the chain extending agent are in almost equimolar amounts.

Examples of the kind of the thermoplastic elastomer that may be applied to the invention include a polyamide-based thermoplastic elastomer (Thermoplastic Amid Elastomer, TPA), a polyester-based thermoplastic elastomer (Thermoplastic Polyester Elastomer, TPC), a polyolefin-based thermoplastic elastomer (Thermoplastic PolyOlefin, TPO), a polystyrene-based thermoplastic elastomer (Styrenic Thermoplastic Elastomer, TPS), a polyurethane-based thermoplastic elastomer (Thermoplastic Polyurethane, TPU), a thermoplastic rubber crosslinked product (ThermoPlastic Vulcanizates, TPV), and other thermoplastic elastomers (Thermoplastic elastomers other, TPZ), as defined by JIS K6418:2007.

Among these, a polyurethane-based thermoplastic elastomer (TPU), a polyamide-based thermoplastic elastomer (TPA), and a polyester-based thermoplastic elastomer (TPC) are preferable since these elastomers are polymers having a linking section originating from a polyaddition reaction, and the physical properties of the thermoplastic elastomer can be modified only by changing the structure and the like of this linking section, and techniques therefor have also been established.

Among the polyurethane-based thermoplastic elastomer (TPU), the polyamide-based thermoplastic elastomer (TPA), and the polyester-based thermoplastic elastomer (TPC), a polyamide-based thermoplastic elastomer (TPA) is more preferable from the viewpoint of hydrolyzability.

In the following description, a polyamide-based thermoplastic elastomer (TPA), a polyurethane-based thermoplastic elastomer (TPU), and a polyester-based thermoplastic elastomer (TPC), which are preferred thermoplastic elastomers for the invention, will be explained.

(Polyamide-Based Thermoplastic Elastomer)

The "polyamide-based thermoplastic elastomer" according to the invention means a thermoplastic elastomer of a copolymer having a polymer that constitutes a portion or the entirety of a hard segment, the hard segment being crystalline and having a high melting point, and a polymer that constitutes a portion or the entirety of a soft segment, the soft segment being amorphous and having a low glass transition temperature, in which the polymer that constitutes a portion or the entirety of the hard segment has amide bonds (—CONH—) in the main chain.

The polyamide-based thermoplastic elastomer may be a material in which at least a polyamide constitutes a portion or the entirety (preferably, the entirety) of a hard segment that is crystalline and has a high melting point, and another polymer (for example, a polyester, a polyether or the like) constitutes a portion or the entirety (preferably, the entirety) of a soft segment that is amorphous and has a low glass transition temperature.

—Hard Segment—

Regarding the polyamide that forms a portion or the entirety of the hard segment, for example, a polyamide synthesized using a monomer represented by the following Formula (1) or Formula (2) may be used.

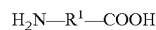  Formula (1):

In Formula (1), $R^1$ represents a molecular chain of a hydrocarbon having from 2 to 20 carbon atoms (for example, an alkylene group having from 2 to 20 carbon atoms).

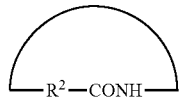  Formula (2)

In Formula (2), $R^2$ represents a hydrocarbon molecular chain having from 3 to 20 carbon atoms (for example, an alkylene group having from 3 to 20 carbon atoms).

In Formula (1), $R^1$ is preferably a hydrocarbon molecular chain having from 3 to 18 carbon atoms (for example, an alkylene group having from 3 to 18 carbon atoms), more preferably a hydrocarbon molecular chain having from 4 to 15 carbon atoms (for example, an alkylene group having from 4 to 15 carbon atoms), and particularly preferably a hydrocarbon molecular chain having from 10 to 15 carbon atoms (for example, an alkylene group having from 10 to 15 carbon atoms). In Formula (2), $R^2$ is preferably a hydrocarbon molecular chain having from 3 to 18 carbon atoms (for example, an alkylene group having from 3 to 18 carbon atoms), more preferably a hydrocarbon molecular chain having from 4 to 15 carbon atoms (for example, an alkylene group having from 4 to 15 carbon atoms), and particularly preferably a hydrocarbon molecular chain having from 10 to 15 carbon atoms (for example, an alkylene group having from 10 to 15 carbon atoms).

Examples of monomers represented by the above Formula (1) or Formula (2) include an ω-aminocarboxylic acid, and a lactam. Examples of the polyamide that forms a part or the whole of a hard segment include a polycondensate of an ω-aminocarboxylic acid, a polycondensate of a lactam, and a co-polycondensate of a diamine and a dicarboxylic acid.

Examples of the ω-aminocarboxylic acid include an aliphatic ω-aminocarboxylic acid having from 5 to 20 carbon atoms, such as 6-aminocaproic acid, 7-aminoheptanoic acid, 8-aminooctanoic acid, 10-aminocapric acid, 11-aminoundecanoic acid, or 12-aminododecanoic acid. Examples of the lactam include an aliphatic lactam having from 5 to 20 carbon atoms, such as lauryllactam, ε-caprolactam, undecanelactam, ω-enantholactam, or 2-pyrrolidone.

Examples of the diamine include diamine compounds such as an aliphatic diamine having from 2 to 20 carbon atoms, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine or metaxylenediamine. The dicarboxylic acid may be represented by HOOC—$(R^3)_m$—COOH, wherein $R^3$ represents a hydrocarbon molecular chain having from 3 to 20 carbon atoms, and m represents 0 or 1. Examples of the dicarboxylic acid include an aliphatic dicarboxylic acid having from 2 to 22 carbon atoms, such as oxalic acid, succinic acid, glutaric acid, adipic acid, pimelic acid, suberic acid, azelaic acid, sebacic acid, or dodecanedioic acid.

Examples of the polyamide that forms a portion or the entirety of the hard segment include a polyamide obtained by ring-opening polycondensation of ε-caprolactam (polyamide 6), a polyamide obtained by ring-opening polycondensation of undecane lactam (polyamide 11), a polyamide obtained by ring-opening polycondensation of lauryl lactam (polyamide 12), a polyamide obtained by polycondensation of 12-aminododecanoic acid (polyamide 12), a polycondensate polyamide of a diamine and a dibasic acid (polyamide 66), and a polyamide having meta-xylenediamine as a constituent unit (amide MX).

Polyamide 6 can be expressed by, for example, {CO—$(CH_2)_5$—NH}$_n$, wherein n represents the number of repeating units, which may be freely set. Here, n is preferably from 2 to 100, and more preferably from 3 to 50.

Polyamide 11 can be expressed by, for example, {CO—$(CH_2)_{10}$—NH}$_n$, wherein n represents the number of repeating units, which may be freely set. Here, n is preferably from 2 to 100, and more preferably from 3 to 50.

Polyamide 12 can be expressed by, for example, {CO—$(CH_2)_{11}$—NH}$_n$, wherein n represents the number of repeating units, which may be freely set. Here, n is preferably from 2 to 100, and more preferably from 3 to 50.

Polyamide 66 can be expressed by, for example, {CO$(CH_2)_4$CONH$(CH_2)_6$NH}$_n$, wherein n represents the number of repeating units, which may be freely set. Here, n is preferably from 2 to 100, and more preferably from 3 to 50.

The amide MX having meta-xylenediamine as a constituent unit may be represented by, for example, the following constituent unit (A-1), wherein n represents the number of repeating units, which may be freely set, and for example, n is preferably from 2 to 100, and more preferably from 3 to 50.

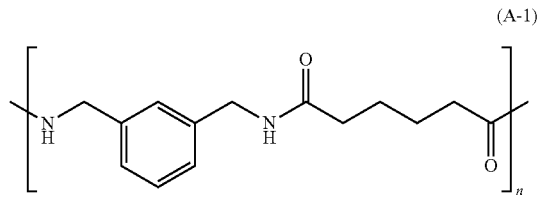

(A-1)

It is preferable that the polyamide-based thermoplastic elastomer has a polyamide having a unit structure represented by [CO—$(CH_2)_{11}$—NH] as a hard segment (polyamide 12). As explained above, polyamide 12 can be obtained by ring-opening polycondensation of lauryl lactam, or polycondensation of 12-aminododecanoic acid.

—Soft segment—

The polymer that forms a portion or the entirety of the soft segment may be, for example, a polyester and a polyether. Further examples include a polyethylene glycol, a polypropylene glycol, a polytetramethylene ether glycol (PTMG), and an ABA-type triblock polyether. These can be used singly or in combination of two or more kinds thereof. Also, a polyetherdiamine obtained by reacting ammonia or the like with a terminal of a polyether may be used, and for example, an ABA-type triblock polyetherdiamine may be used.

Here, the "ABA-type triblock polyether" refers to a polyether represented by the following Formula (3).

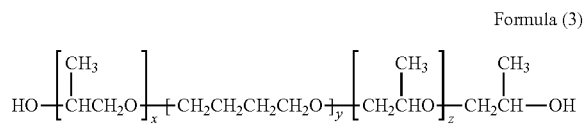

Formula (3)

In Formula (3), each of x and z independently represents an integer from 1 to 20, and y represents an integer from 4 to 50.

In Formula (3), each of x and z is preferably an integer from 1 to 18, more preferably an integer from 1 to 16, particularly preferably an integer from 1 to 14, and most preferably an integer from 1 to 12. In Formula (3), y is preferably an integer from 5 to 45, more preferably an integer from 6 to 40, particularly preferably an integer from 7 to 35, and most preferably an integer from 8 to 30.

The "ABA-type triblock polyether diamine" may be a polyether diamine represented by the following Formula (N).

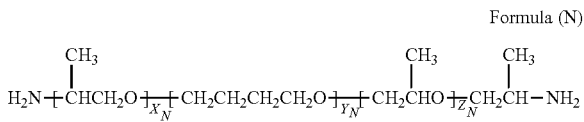

Formula (N)

In Formula (N), each of $X_N$ and $Z_N$ independently represents an integer from 1 to 20, and $Y_N$ represents an integer from 4 to 50.

In Formula (N), each of $X_N$ and $Z_N$ is preferably an integer from 1 to 18, more preferably an integer from 1 to 16, particularly preferably an integer from 1 to 14, and most preferably an integer from 1 to 12. In Formula (N), $Y_N$ is preferably an integer from 5 to 45, more preferably an integer from 6 to 40, particularly preferably an integer from 7 to 35, and most preferably an integer from 8 to 30.

The combination of the hard segment and the soft segment may be a combination of any of the hard segments and the soft segments mentioned above. Above all, a combination of a ring-opening polycondensate of lauryl lactam/polyethylene glycol; a combination of a ring-opening polycondensate of lauryl lactam/polypropylene glycol; a combination of a ring-opening polycondensate of lauryl lactam/polytetramethylene ether glycol; a combination of a ring-opening polycondensate of lauryl lactam/ABA-type triblock polyether; a combination of a ring-opening polycondensate of lauryl lactam/ABA-type triblock polyetherdiamine; a combination of a polycondensate of aminododecanoic acid/polyethylene glycol; a combination of a polycondensate of aminododecanoic acid/polypropylene glycol; a combination of a polycondensate of aminododecanoic acid/polytetramethylene ether glycol; a combination of a polycondensate of aminododecanoic acid/ABA-type triblock polyether; or a combination of a polycondensate of aminododecanoic acid/ABA-type triblock polyetherdiamine is preferred. Furthermore, a combination of a ring-opening polycondensate of lauryl lactam/ABA-type triblock polyether; a combination of a ring-opening polycondensate of lauryl lactam/ABA-type triblock polyetherdiamine; a combination of a polycondensate of aminododecanoic acid/ABA-type triblock polyether; or a combination of a polycondensate of aminododecanoic acid/ABA-type triblock polyetherdiamine is particularly preferred.

The polymer forming a part or the whole of a soft segment may include a diamine, such as a branched saturated diamine having from 6 to 22 carbon atoms, a branched alicyclic diamine having from 6 to 16 carbon atoms or norbornane diamine, as a monomer unit. The branched saturated diamine having from 6 to 22 carbon atoms, the branched alicyclic diamine having from 6 to 16 carbon atoms and norbornane diamine may be used singly, or in combination of two or more thereof. These diamines may also be used in combination with the ABA-type triblock polyether or the ABA-type triblock polyetherdiamine described above.

Examples of the branched saturated diamine having from 6 to 22 carbon atoms include 2,2,4-trimethyl-1,6-hexanediamine, 2,4,4-trimethyl-1,6-hexanediamine, 1,2-diaminopropane, 1,3-diaminopentane, 2-methyl-1,5-diaminopentane and 2-methyl-1,8-diaminooctane.

Examples of the branched alicyclic diamine having from 6 to 16 carbon atoms include 5-amino-2,2,4-trimethyl-1-cyclopentane methyl amine and 5-amino-1,3,3-trimethylcyclohexane methyl amine. Each of these diamines may be in the cis-form or the trans-form, or a mixture of these isomers.

Examples of the norbornane diamine include 2,5-norbornane dimethyl amine, 2,6-norbornane dimethyl amine, or a mixture thereof.

The polymer forming a part or the whole of a soft segment may include other diamine compounds than those described above, as monomer units. Examples of other diamine compounds include an aliphatic diamine such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, or 3-methylpentamethylene diamine, an alicyclic diamine such as bis(4-aminocyclohexyl)methane, bis(4-aminocyclohexyl)propane, 1,3-bisaminomethylcyclohexane or 1,4-bisaminomethylcyclohexane, or an aromatic diamine such as metaxylylenediamine or paraxylylenediamine.

These diamines may be used singly, or in combination of two or more thereof, as appropriate.

—Linking Section—

As described above, the linking section of the polyamide-based thermoplastic elastomer may be, for example, a part linked using a chain extending agent.

Examples of the chain extending agent include a dicarboxylic acid, a diol, and a diisocyanate. Regarding the dicarboxylic acid, for example, at least one selected from an aliphatic, alicyclic or aromatic dicarboxylic acid, or a derivative thereof may be used. Regarding the diol, for example, an aliphatic diol, an alicyclic diol, or an aromatic diol may be used. Regarding the diisocyanate, for example, an aromatic diisocyanate, an aliphatic diisocyanate, an alicyclic diisocyanate, or a mixture thereof may be used.

Examples of the dicarboxylic acid include: aliphatic dicarboxylic acids including a linear aliphatic dicarboxylic acid having from 2 to 25 carbon atoms, such as adipic acid, decane dicarboxylic acid, oxalic acid, succinic acid, glutaric acid, pimelic acid, suberic acid, azelaic acid, sebacic acid, or dodecanedioic acid; a dimerized aliphatic dicarboxylic acid having from 14 to 48 carbon atoms that is a dimerized unsaturated fatty acid obtained by fractional distillation of a triglyceride, and hydrogenated products of these dicarboxylic acid; alicyclic dicarboxylic acids such as 1,4-cyclohexane dicarboxylic acid; and aromatic dicarboxylic acids such as terephthalic acid and isophthalic acid. Among these, dodecanedioic acid, eicosanedioic acid, phenyldiacetic acid, terephthalic acid, and adipic acid are preferable.

Specific examples of the diisocyanate include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylene diisocyanate, isophorone diisocyanate, 4,4'-dicyclohexylmethane diisocyanate, methylcyclohexane diisocyanate, tetramethylxylylene diisocyanate, 2,6-diisopropylphenyl isocyanate, and 1,3,5-triisopropylbenzene-2,4-diisocyanate. Among these, an aromatic diisocyanate is preferable, and 4,4'-diphenylmethane diisocyanate is more preferable.

Specific examples of the diol include ethylene glycol, diethylene glycol, triethylene glycol, propylene glycol, butanediol, hexanediol, neopentyl glycol, cyclohexanediol, cyclohexanedimethanol, hydrogenated bisphenol A, an ethylene oxide adduct of bisphenol A, and a propylene oxide adduct of bisphenol A. Among these, an aliphatic diol is preferable, and butanediol is more preferable.

—Synthesis Method—

The polyamide-based thermoplastic elastomer may be synthesized by copolymerizing a polymer that forms a portion or the entirety of the hard segment and a polymer that forms a portion or the entirety of the soft segment, according to a known method. For example, the polyamide-based thermoplastic elastomer may be obtained by polymerizing a monomer that serves as a raw material of a hard segment (for example, a ω-aminocarboxylic acid such as 12-aminododecanoic acid, or a lactam such as lauryl lactam), a monomer that serves as a raw material of a soft segment (for example, the ABA-type triblock polyether or the ABA-type triblock polyetherdiamine as described above), and if necessary, a chain extending agent (for example, adipic acid or decanedicarboxylic acid) in a vessel. Particularly, in a case in which a ω-aminocarboxylic acid is used as the monomer that serves as a raw material of the hard segment, the polyamide-based thermoplastic elastomer may be synthesized by performing normal pressure melt polymerization, or by performing normal pressure melt polymerization and further performing melt polymerization under reduced pressure. In a case in which a lactam is used as the monomer that serves as a raw material of the hard segment, an appropriate amount of water may be present, and the polyamide-based thermoplastic elastomer may be produced by a method including melt polymerization under a pressure of from 0.1 to 5 MPa and subsequent normal pressure melt polymerization and/or melt polymerization under reduced pressure. These synthesis reactions can be carried out in either in a batch manner or in a continuous manner. Also, for the synthesis reactions described above, a batch reaction tank, mono-tank or multi-tank continuous reaction apparatus, a tubular continuous reaction apparatus or the like may be used singly or in appropriate combination.

In the production of the polyamide-based thermoplastic elastomer, the polymerization temperature is preferably from 150° C. to 300° C., and more preferably from 160° C. to 280° C. The polymerization time may appropriately be set in relation to the number average molecular weight of the polyamide-based thermoplastic elastomer to be synthesized, and the polymerization temperature. For example, the polymerization time is preferably from 0.5 to 30 hours, and more preferably from 0.5 to 20 hours.

In the production of the polyamide-based thermoplastic elastomer, additives may be added, as necessary, in order to adjust the molecular weight or stabilize the melt viscosity at the time of shaping, and examples of additives include monoamins or diamines such as laurylamine, stearylamine, hexamethylenediamine, and metaxylylenediamine, and monocarboxylic acids or dicarboxylic acids such as acetic acid, benzoic acid, stearic acid, adipic acid, sebacic acid and dodecanedioic acid. Additives may be selected, as appropriate, in consideration of the molecular weight and viscosity of the polyamide-based thermoplastic elastomer to be obtained, provided that the additives should not adversely affect the effect according to the invention.

In the production of the polyamide-based thermoplastic elastomer, catalysts may be used, as necessary. The catalyst may be, for example, a compound containing at least one selected from the group consisting of P, Ti, Ge, Zn, Fe, Sn, Mn, Co, Zr, V, Ir, La, Ce, Li, Ca and Hf.

For example, examples include inorganic phosphorus compounds, organic titanium compounds, organic zirconium compounds and organic tin compounds.

Specifically, examples of inorganic phosphorus compounds include: phosphorus-containing acids such as phosphoric acid, pyrophosphoric acid, polyphosphoric acid, phosphorous acid and hypophosphorous acid; alkali metal salts of phosphorus-containing acids; or alkaline earth metal salts of phosphorus-containing acids.

Examples or organic titanium compounds include titanium alkoxides (such as titanium tetrabutoxide or titanium tetraisopropoxide).

Examples of organic zirconium compounds include zirconium alkoxides (such as zirconium tetrabutoxide (also indicated as "Zr(OBu)$_4$" or "Zr(OC$_4$H$_8$)$_4$")).

Examples of organic tin compounds include distannoxane compounds (such as 1-hydroxy-3-isothiocyanate-1,1,3,3-tetrabutyldistannoxane), tin acetate, dibutyltin dilaurate, or butyltin hydroxide oxide hydrate.

The amount of the catalyst to be added and the timing of addition of the catalyst are not particularly limited as long as the desired product can be obtained quickly.

Examples of the polyamide-based thermoplastic elastomer include a combination of a ring-opening polycondensate of lauryl lactam/polyethylene glycol/adipic acid, a combination of a ring-opening polycondensate of lauryl lactam/polypropylene glycol/adipic acid, a combination of a ring-opening polycondensate of lauryl lactam/polytetramethylene ether glycol/adipic acid, a combination of a ring-opening polycondensate of lauryl lactam/ABA-type triblock polyether/adipic acid, a combination of a ring-opening polycondensate of lauryl lactam/ABA-type triblock polyetherdiamine/decanedicarboxylic acid, a combination of a ring-opening polycondensate of lauryl lactam/polyethylene glycol/decanedicarboxylic acid, a combination of a ring-opening polycondensate of lauryl lactam/polypropylene glycol/decanedicarboxylic acid, a combination of a ring-opening polycondensate of lauryl lactam/polytetramethylene ether glycol/decanedicarboxylic acid, a combination of a ring-opening polycondensate of lauryl lactam/ABA-type triblock polyether/decanedicarboxylic acid, a combination of a ring-opening polycondensate of lauryl lactam/ABA-type triblock polyetherdiamine/decanedicarboxylic acid, a combination of a polycondensate of aminododecanoic acid/polyethylene glycol/adipic acid, a combination of a polycondensate of aminododecanoic acid/polypropylene glycol/adipic acid, a combination of a polycondensate of aminododecanoic acid/polytetramethylene ether glycol/adipic acid, a combination of a polycondensate of aminododecanoic acid/ABA-type triblock polyether/adipic acid, a combination of a polycondensate of aminododecanoic acid/ABA-type triblock polyetherdiamine/adipic acid, a combination of a polycondensate of aminododecanoic acid/polyethylene glycol/decanedicarboxylic acid, a combination of a polycondensate of aminodocanoic acid/polypropylene glycol/decanedicarboxylic acid/a combination of a polycondensate of aminododecanoic acid/polytetramethylene ether glycol/decanedicarboxylic acid, a combination of a polycondensate of aminododecanoic acid/ABA-type triblock polyether/decanedicarboxylic acid, or a combination of a polycondensate of aminododecanoic acid/ABA-type triblock polyetherdiamine/decanedicarboxylic acid is preferred. Furthermore, a combination of a ring-opening polycondensate of lauryl lactam/ABA-type triblock polyether/adipic acid, a combination of a polycondensate of aminododecanoic acid/ABA-type triblock polyether/adipic acid, a combination of a polycondensate of aminododecanoic acid/ABA-type triblock polyetherdiamine/decanedicarboxylic acid, a combination of a polycondensate of aminododecanoic acid/polytetramethylene ether glycol/adipic acid, or a combination of a polycondensate of aminododecanoic acid/polytetramethylene ether glycol/decanedicarboxylic acid is particularly preferred. Regarding the polyamide-based thermoplastic elastomer, any combination of the preferred embodiments described above in connection with the combination of constituent units, the composition ratio thereof, the molecular weight, and the like may be used.

(Polyester-Based Thermoplastic Elastomer)

The polyester-based thermoplastic elastomer may be a material in which at least a polyester constitutes a portion or the entirety of a crystalline hard segment having a high melting point, and another polymer (for example, polyester or polyether) constitutes a portion or the entirety of an amorphous soft segment having a low glass transition temperature.

—Hard Segment—

Regarding the crystalline polyester that forms a portion or the entirety of the hard segment in the polyester-based thermoplastic elastomer, an aromatic polyester may be used. An aromatic polyester can be formed using, for example, an aromatic dicarboxylic acid or an ester-forming derivative thereof, and an aliphatic diol.

Examples of the aromatic polyester that forms a portion or the entirety of the hard segment include polyethylene terephthalate, polybutylene terephthalate, polystyrene terephthalate, polyethylene naphthalate, and polybutylene naphthalate. Polybutylene terephthalate is preferable.

One of suitable aromatic polyesters that form a portion or the entirety of the hard segment may be polybutylene terephthalate derived from terephthalic acid and/or dimethyl terephthalate and 1,4-butanediol. Another suitable aromatic polyesters that form a portion or the entirety of the hard segment may be a polyester derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid, or an ester-forming derivative thereof, and a diol having a molecular weight of 300 or less [for example, an aliphatic diol such as ethylene glycol, trimethylene glycol, pentamethylene glycol, hexamethylene glycol, neopentyl glycol, or decamethylene glycol; an alicyclic diol such as 1,4-cyclohexanedimethanol or tricyclodecanedimethylol; or an aromatic diol such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, or 4,4'-dihydroxy-p-quaterphenyl]; or a copolymerized polyester obtained using two or more kinds of these dicarboxylic acid components and diol components in combination. It is also possible to copolymerize a polyfunctional carboxylic acid component having a functionality of 3 or more, a polyfunctional oxyacid component having a functionality of 3 or more, a polyfunctional hydroxy component having a functionality of 3 or more and the like in an amount in the range of 5 mol % or less.

—Soft Segment—

Regarding the polymer that forms a portion or the entirety of the soft segment, for example, a polymer selected from an aliphatic polyester or an aliphatic polyether may be employed.

Examples of the aliphatic polyether include poly(ethylene oxide) glycol, poly(propylene oxide) glycol, poly(tetramethylene oxide) glycol, poly(hexamethylene oxide) glycol, a copolymer of an ethylene oxide and propylene oxide, an ethylene oxide addition polymer of poly(propylene oxide) glycol, and a copolymer of ethylene oxide and tetrahydrofuran.

Examples of the aliphatic polyester include poly(ε-caprolactone), polyenantholactone, polycaprylolactone, polybutylene adipate, and polyethylene adipate.

Among these aliphatic polyethers and aliphatic polyesters, from the viewpoint of the elasticity property of the obtained copolymer, poly(tetramethylene oxide) glycol, an ethylene oxide adduct of poly(propylene oxide) glycol, poly(ε-caprolactone), polybutylene adipate, polyethylene adipate or the like is preferable.

—Linking Section—

The linking section may be, for example, a part linked by a chain extending agent. Examples of the chain extending agent include the chain extending agents described above in connection with the polyamide-based thermoplastic elastomer.

A polyester-based thermoplastic elastomer may be synthesized by copolymerizing a polymer that forms a portion or the entirety of the hard segment and a polymer that forms a portion or the entirety of the soft segment, according to a known method.

(Polyurethane-Based Thermoplastic Elastomer)

The polyurethane-based thermoplastic elastomer may be a material in which at least polyurethane constitutes a portion or the entirety of a hard segment having pseudo-crosslinking formed by physical aggregation, and another polymer constitutes a portion or the entirety of a soft segment that is amorphous and has a low glass transition temperature. For example, the polyurethane-based thermoplastic elastomer may be represented as a copolymer including a soft segment containing a unit structure represented by the following Formula A and a hard segment containing a unit structure represented by the following Formula B.

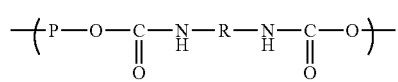

Formula A

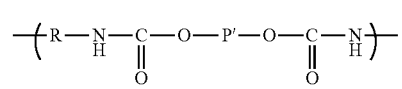

Formula B

—Soft Segment—

In Formula A, P represents a long-chain aliphatic polyether or a long-chain aliphatic polyester. In Formula A or Formula B, R represents an aliphatic hydrocarbon, an alicyclic hydrocarbon, or an aromatic hydrocarbon. In Formula B, P' represents a short-chain aliphatic hydrocarbon, an alicyclic hydrocarbon, or an aromatic hydrocarbon.

Regarding the long-chain aliphatic polyether and the long-chain aliphatic polyester represented by P in Formula A, for example, those having a molecular weight of from 500 to 5,000 can be used. P originates from a diol compound containing a long-chain aliphatic polyether or a long-chain aliphatic polyester represented by P. Examples of such a diol compound include polyethylene glycol, polypropylene glycol, polytetramethylene ether glycol, poly(butylene adipate) diol, poly-ε-caprolactone diol, poly(hexamethylene carbonate) diol, and the ABA-type triblock polyether, all of which have a molecular weight in the range described above.

These may be used singly or in combination of two or more kinds thereof.

In Formula A, R originates from a diisocyanate compound containing an aliphatic hydrocarbon, an alicyclic hydrocarbon or an aromatic hydrocarbon represented by R. Examples of an aliphatic diisocyanate compound containing an aliphatic hydrocarbon represented by R include 1,2-ethylene diisocyanate, 1,3-propylene diisocyanate, 1,4-butane diisocyanate, and 1,6-hexamethylene diisocyanate.

Examples of a diisocyanate compound containing an alicyclic hydrocarbon represented by R include 1,4-cyclohexane diisocyanate and 4,4-cyclohexane diisocyanate. Furthermore, examples of an aromatic diisocyanate compound containing an aromatic hydrocarbon represented by R include 4,4'-diphenylmethane diisocyanate and tolylene diisocyanate.

These may be used singly or in combination of two or more kinds thereof.

—Hard Segment—

In Formula B, regarding the short-chain aliphatic hydrocarbon, the alicyclic hydrocarbon or the aromatic hydrocarbon represented by P', for example, a hydrocarbon having a molecular weight of less than 500 may be used. P' originates from a diol compound containing a short-chain aliphatic hydrocarbon, an alicyclic hydrocarbon or an aromatic hydrocarbon represented by P'. Examples of an aliphatic diol compound containing a short-chain aliphatic hydrocarbon represented by P' include a glycol and a polyalkylene glycol. Examples thereof include ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol, and 1,10-decanediol.

Furthermore, examples of an alicyclic diol compound containing an alicyclic hydrocarbon represented by P' include cyclopentane-1,2-diol, cyclohexane-1,2-diol, cyclohexane-1,3-diol, cyclohexane-1,4-diol, and cyclohexane-1,4-dimethanol.

Examples of an aromatic diol compound containing an aromatic hydrocarbon represented by P' include hydroquinone, resorcin, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenyl sulfide, 4,4'-dihydroxydiphenylsulfone, 4,4'-dihydroxybenzophenone, 4,4'-dihydroxydiphenylmethane, bisphenol A, 1,1-di(4-hydroxyphenyl)cyclohexane, 1,2-bis(4-hydroxyphenoxy)ethane, 1,4-dihydroxynaphthalene, and 2,6-dihydroxynaphthalene.

These may be used singly or in combination of two or more kinds thereof.

Also, R in Formula B is the same as R in Formula A.

—Linking Section—

The linking section may be, for example, a part linked by a chain extending agent. Examples of the chain extending agent include the chain extending agents described above in connection with the polyamide-based thermoplastic elastomer.

The polyurethane-based thermoplastic elastomer may be synthesized by copolymerizing a polymer that forms a portion or the entirety of a hard segment and a polymer that forms a portion or the entirety of a soft segment, according to a known method.

Specific examples of the polyurethane-based thermoplastic elastomer include tolylene diisocyanate (TDI)/polyester-based polyol copolymer, TDI/polyether-based polyol copolymer, TDI/caprolactone-based polyol copolymer, TDI/polycarbonate-based polyol copolymer, 4,4'-diphenylmethane diisocyanate (MDI)/polyester-based polyol copolymer, MDI/polyether-based polyol copolymer, MDI/caprolactone-based polyol copolymer, or MDI/polycarbonate-based polyol copolymer is preferred; TDI and a polyester-based polyol, TDI and a polyether-based polyol, MDI and a polyester polyol, or MDI and a polyether-based polyol are more preferred.

The resin material may include various additives, as desired, such as rubber, various fillers (for example, silica, calcium carbonate, or clay), anti-aging agents, oils, plasticizers, colorants, weather resistance agents and reinforcing agents. The contents of the additives in the resin material (tire frame) are not particularly limited, and the additives may be used, as appropriate, in a range in which the effect according to the invention is not impaired. When non-resinous components, such as additives, are added to the resin material, the content of resin component in the resin material is preferably 50% by mass or more, and more preferably 90% by mass or more, with respect to the total amount of the resin material. The content of resin component in the resin material is the balance remaining after subtracting the total content of the various additives from the total amount of the resin components.

<Physical Properties of Resin Material>

Next, preferable physical properties of the resin material forming a part or the whole of the tire frame will be described. The tire frame according to the invention is formed using the resin material.

The melting point (or softening point) of the resin material (tire frame) is ordinarily from 100° C. to 350° C., and preferably approximately from 100° C. to 250° C. From the viewpoint of tire productivity, the melting point (softening point) is preferably approximately from 120° C. to 250° C., and more preferably from 120° C. to 200° C.

When, for example, a tire frame is formed by fusing divided parts (frame pieces) of the tire frame, use of a resin material having a melting point of 120° C. to 250° C. provides a sufficient adhesive strength between tire frame pieces in a frame formed by fusing at a surrounding temperature of 120° C. to 250° C. Therefore, the tire according to the invention has excellent durability at running, such as puncture resistance or wear resistance. The heating temperature described above is preferably a temperature that is 10° C. to 150° C. higher than the melting point (or softening point) of the resin material forming a part or the whole of the tire frame, and more preferably a temperature that is 10° C. to 100° C. higher than the melting point (or softening point) of the resin material forming a part or the whole of the tire frame.

The resin material can be obtained by adding various additives, if necessary, and appropriately mixing the ingredients using a known method (for example, melt mixing). The resin material obtained by melt mixing may be shaped into pellets, if necessary, and used.

The tensile strength at yield as defined in Japanese Industrial Standards (JIS) K7113:1995 of the resin material (tire frame) itself is preferably 5 MPa or more, more preferably from 5 MPa to 20 MPa, and still more preferably from 5 MPa to 17 MPa. When the tensile strength at yield of the resin material is 5 MPa or more, the resin material can endure deformation due to a load applied to the tire at, for example, running.

The tensile elongation at yield as defined in JIS K7113:1995 of the resin material (tire frame) itself is preferably 10% or more, more preferably from 10% to 70%, and still more preferably from 15% to 60%. When the tensile elongation at yield of the resin material is 10% or more, the elastic range is large, and air seal property can be improved.

The tensile elongation at break as defined in JIS K7113:1995 of the resin material (tire frame) itself is preferably 50% or more, preferably 100% or more, still more preferably 150% or more, and particularly preferably 200% or more. When the tensile elongation at break of the resin material is 50% or more, rim fittability is excellent, and the tire is resistant to breakage upon impact.

The deflection temperature under load as defined in ISO75-2 or ASTM D648 of the resin material (tire frame) itself (under a load of 0.45 MPa) is preferably 50° C. or higher, preferably from 50° C. to 150° C., and more preferably from 50° C. to 130° C. When the deflection temperature under load of the resin material is 50° C. or higher, deformation of the tire frame can be reduced even when vulcanization is performed in tire production.

First Embodiment

A tire according to a first embodiment of the tire according to the invention is described below with reference to drawings.

Figure 1B:
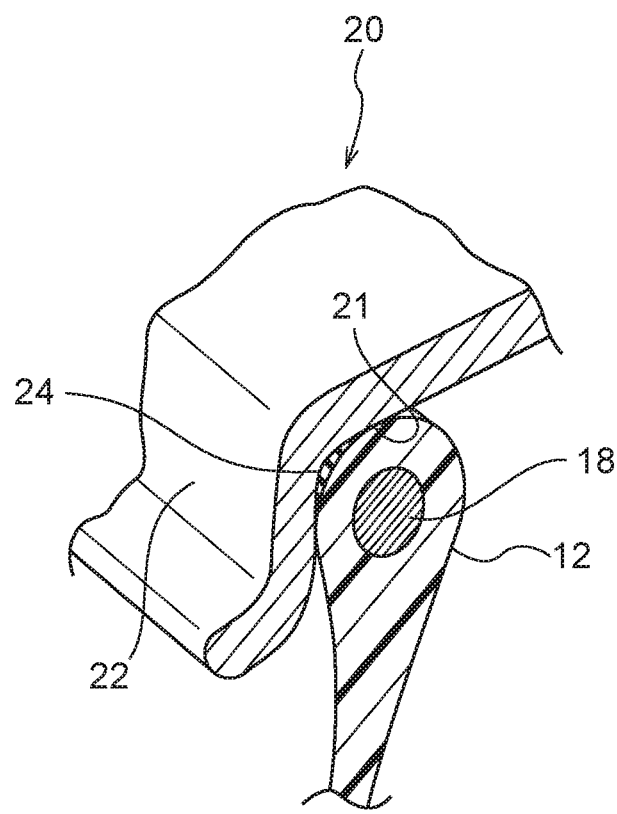
FIG. 1B is a cross-sectional view of a bead portion mounted on a rim in a tire according to one embodiment of the invention.

A tire 10 according to this embodiment is described below. FIG. 1A is a perspective view illustrating a cross-section of a part of a tire according to one embodiment of the invention. FIG. 1B is a cross-sectional view of a bead portion mounted on a rim. As illustrated in FIG. 1, the tire 10 according to the present embodiment has a cross-sectional shape that is substantially similar to those of conventional ordinary pneumatic rubber tires.

As illustrated in FIG. 1A, the tire 10 includes a tire case 17 that includes: a pair of bead portions 12 that contact a bead sheet portion 21 and a rim flange 22 of a rim 20 illustrated in FIG. 1B; side portions 14 that each outwardly extend from a bead portion 12 in the tire radial direction; and a crown portion 16 (outer circumferential portion) that connects the tire-radial-direction outer end of one side portion 14 and the tire-radial-direction outer end of the other side portion 14.

Here, in regard to the tire case 17 according to the present embodiment, for example, a resin material obtained by incorporating various additives into a thermoplastic elastomer having a structure including a hard segment (HS) and a soft segment (SS), which repeat alternately, in which the number of repeating units in one molecular chain is 2 to 10, each of the repeating units being a pair of the hard segment (HS) and the soft segment (SS), the thermoplastic elastomer having a number average molecular weight of from 45,000 to 160,000, can be used as the resin material.

Although the tire case 17 is made of a single resin material in the present embodiment, the invention is not limited to this configuration, and thermoplastic resin materials having different properties may be used for the respective parts of the tire case 17 (for example, side portions 14, a crown portion 16 and bead portions 12), similar to conventional ordinary rubber pneumatic tires. Further, a reinforcing member (for example, a polymer or metal fiber, cord, non-woven fabric, or woven fabric) may be embedded in the tire case 17 (for example, in the bead portions 12, in the side portions 14 or in the crown portion 16), so as to reinforce the tire case 17 with the reinforcing member.

The tire case 17 according to the present embodiment is a member obtained by joining together a pair of tire case half parts (tire frame pieces) 17A formed only of a resin material. Each tire case half part 17A is formed by producing an integrated body composed of one bead portion 12, one side portion 14 and a half-width part of the crown portion 16 by molding such as injection molding. The tire case 17 is formed by disposing the formed tire case half parts 17A, which have the same annular shape, to face to each other, and joining them together at the tire equatorial plane. The tire case 17 is not limited to those obtained by joining together two members, and may be formed by joining together three or more members.

Each of the tire case half parts 17A formed using at least the above-described resin material may be shaped using, for example, vacuum molding, pressure forming, injection molding or melt casting. Therefore, vulcanization is unnecessary, the production process can greatly be simplified, and the forming time can be saved, as compared to the case of forming a tire case with rubber as in conventional techniques.

In the present embodiment, the tire case half parts 17A have a bilaterally symmetric shape, i.e., one of the tire case half parts 17A has the same shape as the other tire case half part 17A. Therefore, there is also an advantage in that only one type of mold is required for forming the tire case half parts 17A.

In the present embodiment, an annular bead core 18 made only of a steel cord similar to those used in conventional ordinary pneumatic tires is embedded in each of the bead portions 12, as illustrated in FIG. 1B. However, the invention is not limited to this configuration, and the bead core 18 may be omitted as long as it is ensured that the bead portion 12 has rigidity, and mounting on the rim 20 can be performed successfully. The bead core 18 may alternatively be formed using, for example, an organic fiber cord, a resin-coated organic fiber cord, or a hard resin, instead of a steel cord.

In the present embodiment, an annular sealing layer 24 formed of a material (for example, rubber) having a higher sealing property than that of the resin material forming a part or the whole of the tire case 17 is provided on a part of the bead portion 12 that contacts the rim 20 or at least on a part of the bead portion 12 that contacts the rim flange 22 of the rim 20. The sealing layer 24 may also be provided in a part in which the tire case 17 (the bead portion 12) and the bead seat 21 contact each other. A material softer than the resin material that forms a part or the whole of the tire case 17 may be used as the material having a higher sealing property than that of the resin material that forms a part or the whole of the tire case 17. As rubbers usable for the sealing layer 24, the same types of rubbers as the rubbers used on the outer surfaces of the bead portions of conventional ordinary pneumatic rubber tires are preferably used. Another thermoplastic resin (thermoplastic elastomer) having a higher sealing property than that of the resin material may be used. Examples of another thermoplastic resin include a polyurethane-based resin, a polyolefin-based resin, a polystyrene-based thermoplastic resin, or a polyester resin, or a blend of any of these resins with a rubber or an elastomer. It is also possible to use a thermoplastic elastomer, such as a polyester-based thermoplastic elastomer, a polyurethane-based thermoplastic elastomer, a polystyrene-based thermoplastic elastomer, a polyolefin-based thermoplastic elastomer, or a combination of two or more of these elastomers or a blend of any of these elastomers with a rubber.

As illustrated in FIG. 1, a reinforcing cord 26 having a higher rigidity than that of the resin material forming a part or the whole of the tire case 17 is wound around the crown portion 16 in the circumferential direction of the tire case 17. The reinforcing cord 26 is helically wound to form a reinforcing cord layer 28 in a state in which at least a part of the reinforcing cord 26 is embedded in the crown portion 16 in cross-sectional view taken along the axial direction of tire case 17. A tread 30 formed of a material (for example, rubber) having a higher wear resistance than that of the resin material forming a part or the whole of the tire case 17 is disposed at the tire-radial-direction outer circumferential side of the reinforcing cord layer 28.

Figure 2:
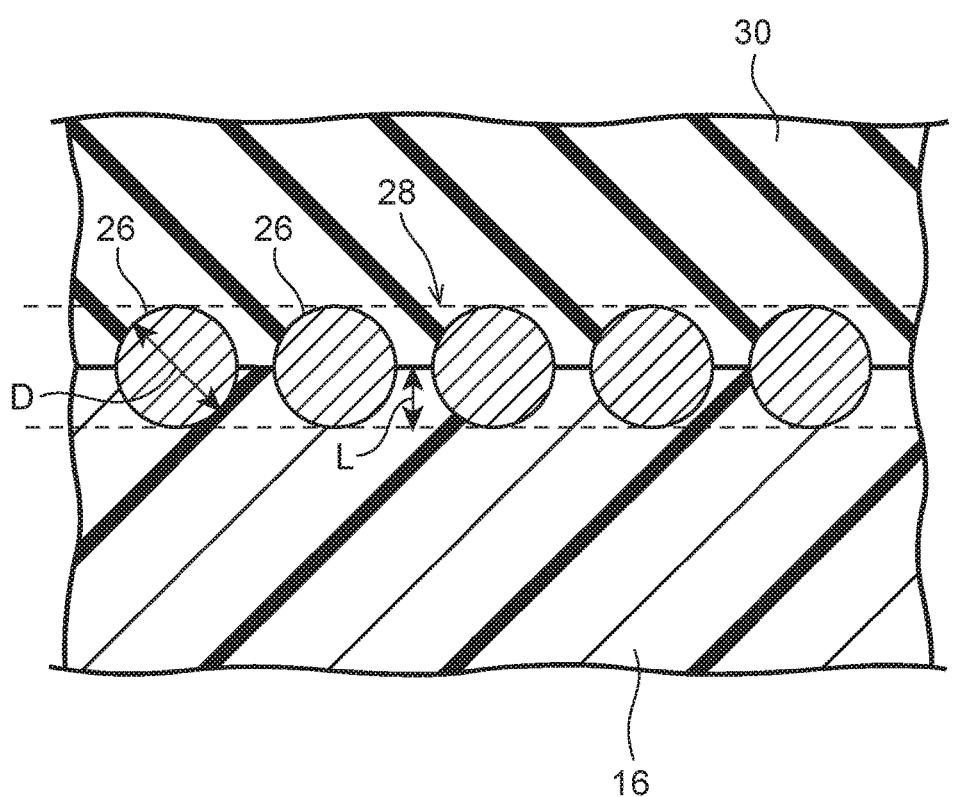
FIG. 2 is a cross-sectional view taken along a tire rotation axis that illustrates a state in which a reinforcing cord is embedded in a crown portion of a tire case of a tire according to a first embodiment.

The reinforcing cord layer 28 formed by the reinforcing cord 26 is described below with reference to FIG. 2. FIG. 2 is a cross-sectional view taken along the tire rotation axis, which illustrates a state in which the reinforcing cord is embedded in the crown portion of the tire case of the tire according to the first embodiment. As illustrated in FIG. 2, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 indicated by the intermittent lines in FIG. 2. The part of the reinforcing cord 26 that is embedded in the crown portion 16 is in close contact with the resin material forming a part or the whole of the crown portion 16 (the tire case 17). A monofilament (single filament) of a metal fiber, an organic fiber, or the like, or a multifilament (stranded filament) in which such fibers are stranded, such as a steel cord composed of stranded steel fibers, may be used as the reinforcing cord 26. In the present embodiment, a steel cord is used as the reinforcing cord 26.

The depth L of embedding in FIG. 2 illustrates the depth of embedding of the reinforcing cord 26 in the tire case 17 (the crown portion 16) along the tire rotation axis direction. The depth L of embedding of the reinforcing cord 26 in the crown portion 16 is preferably equal to or greater than ⅕ of the diameter D of the reinforcing cord 26, and more preferably more than ½ of the diameter D of the reinforcing cord 26. It is most preferable that the entire reinforcing cord 26 is embedded in the crown portion 16. When the depth L of embedding of the reinforcing cord 26 is more than ½ of the diameter D of the reinforcing cord 26, the reinforcing cord 26 is less likely to drop off from the embedded portion due to the dimensions of the reinforcing cord 26. When the entire reinforcing cord 26 is embedded in the crown portion 16, the surface (the outer circumferential surface) becomes flat, whereby entry of air into an area around the reinforcing cord can be reduced even when a member is placed on the crown portion 16 in which the reinforcing cord 26 is embedded. The reinforcing cord layer 28 corresponds to a belt disposed on the outer circumferential surface of a carcass of a conventional pneumatic rubber tire.

As described above, the tread 30 is disposed on the tire-radial-direction outer circumferential side of the reinforcing cord layer 28. It is preferable that the same type of rubber as that used for conventional pneumatic rubber tires is used as the rubber used for the tread 30. A crown formed of another type of resin material having higher wear resistance than that of the resin material forming a part or the whole of the tire case 17 may be used, in place of the tread 30. In the tread 30, a tread pattern composed of plural grooves is formed on the contact surface that comes into contact with a road surface, similar to conventional pneumatic rubber tires.

A method of manufacturing a tire according to the present embodiment is described below.

(Tire Case Forming Process)

First, tire case half parts are formed using a resin including a thermoplastic resin elastomer according to the invention, as described above. The forming of these tire cases is preferably performed using injection molding. Then, the tire case half parts supported by thin metal support rings are aligned to face each other. Subsequently, a jointing mold, not illustrated in the drawings, is placed so as to contact the outer circumferential surface of a butt portion of the tire case half parts. The jointing mold is configured to pressurize a region at or around the joint portion (the butt portion) of the tire case half parts 17A with a predetermined pressure. Then, the pressure is applied to the region at or around the joint portion of the tire case half parts at a temperature equal to or higher than the melting point (or softening point) of the resin material that forms a part or the whole of the tire case. When the joint portion of the tire case half parts is heated and pressurized by the jointing mold, the joint portion is melted, and the tire case half parts are fused with each other, as a result of which the members are integrated to form the tire case 17. Although the joint portion of the tire case half parts is heated using the jointing mold in the present embodiment, the invention is not limited thereto; heating of the joint portion may be carried out using, for example, a separately provided high frequency heater, or the tire case half parts may be bonded by softening or melting the joint portion, in advance, via application of hot air, irradiation with infrared radiation, or the like, and applying a pressure to the joint portion using the jointing mold.

(Reinforcing Cord Member Winding Step)

Next, although drawings are not provided, a reinforcing cord layer 28 may be formed on the outer circumferential side of the crown portion 16 of the tire case 17 by winding a heated reinforcing cord 26 on the outer circumferential surface of the crown portion 16 such that the heated reinforcing cord 26 is embedded in the outer circumferential surface of the crown portion 16, using a cord supplying apparatus equipped with a reel having a reinforcing cord 26 wound thereon, a cord heating apparatus, various rollers and the like.

In this way, a reinforcing cord layer 28 is formed on the outer circumferential side of the crown portion 16 of the tire case 17 by winding the heated reinforcing cord 26 on the outer circumferential surface of the crown portion 16 such that the heated reinforcing cord 26 is embedded in the outer circumferential surface of the crown portion 16.

Then, a belt-shaped vulcanized tread 30 is wound on the outer circumferential surface of the tire case 17 for one revolution, and the tread 30 is bonded to the outer circumferential surface of the tire case 17 using, for example, an adhesive. For example, precured crowns known thus far for use in retreaded tires may be used as the tread 30. The present process is a process similar to the process of bonding a precured crown to the outer circumferential surface of a casing of a retreaded tire.

A tire 10 can be completed by bonding a sealing layer 24 formed only of a vulcanized rubber to the bead portion 12 of the tire case 17 using, for example, an adhesive.

(Effects)

In the tire 10 according to the present embodiment, a portion or the entirety of the tire case 17 is formed of a resin material including a thermoplastic elastomer having a structure including a hard segment (HS) and a soft segment (SS), which repeat alternately, in which a number of repeating units in one molecular chain is from 2 to 10, each of the repeating units being a pair of the hard segment (HS) and the soft segment (SS), the thermoplastic elastomer having a number average molecular weight of from 45,000 to 160,000. Therefore, the tire 10 of the present embodiment has a desirable elastic modulus and excellent low loss property.

In the tire 10 according to the present embodiment, on the outer circumferential surface of the crown portion 16 of the tire case 17 formed using at least a resin material, a reinforcing cord 26 having higher rigidity than that of the resin material is helically wound along the circumferential direction, and therefore, puncture resistance, cutting resistance, and rigidity in the circumferential direction of the tire 10 are enhanced. When the rigidity in the circumferential direction of the tire 10 is enhanced, creeping of the tire case 17 formed using at least a resin material is prevented.

Furthermore, since at least a portion of the reinforcing cord 26 is embedded on the outer circumferential surface of a crown portion 16 of a tire case 17 formed using at least a resin material and is in close contact with the resin material, as is seen in a cross-sectional view (cross-section illustrated in FIG. 1) along the axial direction of the tire case 17, air inclusion at the time of production is suppressed, and movement of the reinforcing cord 26 caused by force applied during driving is suppressed. Thereby, detachment or the like in the reinforcing cord 26, the tire case 17 and the tread 30 is suppressed, and durability of the tire 10 is improved.

Further, as illustrated in FIG. 2, since the depth L of embedding of the reinforcing cord 26 is ⅕ or more of the diameter D, air inclusion at the time of production is effectively suppressed, and movement of the reinforcing cord 26 caused by force applied during driving or the like is further suppressed.

Furthermore, since an annular bead core 18 formed of a metal material only is embedded in the bead portion 12, the tire case 17, that is, the tire 10 can be firmly retained on the rim 20, similarly to the case of conventional pneumatic rubber tires.

Moreover, since a sealing layer 24 formed only of a rubber material having higher sealing property than that of the resin material forming a portion or the entirety of the tire case 17, is provided on a part of the bead portion 12 that contacts with the rim 20, sealing property between the tire 10 and the rim 20 is improved. Therefore, air leakage within the tire is further suppressed, compared to the case in which only the rim 20 and the resin material that forms a portion or the entirety of the tire case 17 are sealed. Rim fittability is also enhanced by providing the sealing layer 24.

Although a configuration in which the reinforcing cord 26 is heated is adopted in the first embodiment, a configuration in which the outer circumference of the reinforcing cord 26 is coated with the same resin material as that of the tire case 17, for example, may be adopted. In this case, by heating the coated resin material along with the reinforcing cord 26 when the coated reinforcing cord is wound on the crown portion 16 of the tire case 17, incorporation of air during embedding the reinforcing cord in the crown portion 16 can effectively be reduced.

Helically winding the reinforcing cord 26 is easy from the viewpoint of manufacture. However, a method in which reinforcing cords 26 are provided such that reinforcing cords aligned in the width direction are discontinuous may also be contemplated.

The tire 10 in the first embodiment is what is referred to as a tubeless tire, in which an air chamber is formed between the tire 10 and the rim 20 by fitting the bead portions 12 to the rim 20. However, the invention is not limited to this configuration, and a complete tube shape may be adopted.

Although modes for carrying out the invention are described above with reference to embodiments, these embodiments are examples, and may be practiced with various modifications within a range not departing from the spirit of the invention. Of course, the protection scope of the invention is not limited to these embodiments.

EXAMPLES

The invention is more specifically described below by reference to examples. However the invention is not limited thereto.

Example 1

Synthesis of Hard Segment (HS): PA12 (Nylon 12) Having a Number Average Molecular Weight of 3,900

43.7 g of 12-aminododecanoic acid manufactured by Sigma-Aldrich Company, 600 g of aminododecanolactam, and 38.3 g of dodecanedioic acid (amount by which the molecular weight would become the molecular weight of HS described in the following Table 1) were introduced into a reaction vessel having a volume of 2 liters and equipped with a stirrer, a nitrogen gas inlet port, and a condensation water discharge port. The air inside the vessel was sufficiently replaced by nitrogen, and then the temperature was raised to 280° C. The content was allowed to react for 4 h (hours) at an elevated pressure of 0.6 MPa. After the pressure was released, the content was further allowed to react for one hour under nitrogen flow, whereby a desired PA12 polymer having a number average molecular weight of about 3.900 was obtained as a white solid.

Production of Thermoplastic Elastomer

To 300 g of the PA12 (HS, number average molecular weight 3,900) thus obtained, 147 g (amount by which the HS/SS mass ratio would have the value described in the following Table 1) of a polyoxypropylenediamine (manufactured by Huntsman Corp., ELASTAMINE RP-2009) having a molecular weight of 2,000 (corresponding to the molecular weight of SS described in the following Table 1) as the SS was added, and the mixture was stirred for 5 hours at 230° C. Subsequently, 1 g of Irganox 1010 (manufactured by BASF SE) was added thereto, and the reaction was completed. Unreacted substances were extracted using a mixed solvent of isopropanol and hexafluoroisopropanol, whereby a polyamide-based thermoplastic elastomer having a controlled number of repeating units was obtained.

The polyamide-based thermoplastic elastomer thus obtained was pelletized and injection molded at 220° C., whereby a sample piece was obtained. Each measurement was performed using samples obtained by stamping out specimens from this sample piece.

Example 2

Production was carried out in the same manner as in Example 1, except that a polyamide-based thermoplastic elastomer having a number average molecular weight of about 54,000 was obtained by changing the amount of dodecanedioic acid used in Example 1 to 24.5 g (amount by which the molecular weight would become the molecular weight of HS described in the following Table 1), and replacing the SS used in Example 1 with 168 g (amount by which the HS/SS mass ratio would have the value described in the following Table 1) of a polyoxypropylenediamine (manufactured by Wako Pure Chemical Industries, Ltd.) having a molecular weight of 3,000 (corresponding to the molecular weight of SS described in the following Table 1).

Example 3

Production was carried out in the same manner as in Example 1, except that a polyamide-based thermoplastic elastomer having a number average molecular weight of about 59,000 was obtained by changing the amount of dodecanedioic acid used in Example 1 to 18.8 g (amount by which the molecular weight would become the molecular weight of HS described in the following Table 1), and replacing the SS used in Example 1 with 156 g (amount by which the HS/SS mass ratio would have the value described in the following Table 1) of a polyoxypropylenediamine (manufactured by Wako Pure Chemical Industries, Ltd.) having a molecular weight of 4,000 (corresponding to the molecular weight of SS described in the following Table 1).

Example 4

Production was carried out in the same manner as in Example 1, except that a polyamide-based thermoplastic elastomer having a number average molecular weight of about 72,000 was obtained by changing the amount of dodecanedioic acid used in Example 1 to 12 g (amount by which the molecular weight would become the molecular weight of HS described in the following Table 1), and replacing the SS used in Example 1 with 150 g (amount by which the HS/SS mass ratio would have the value described in the following Table 1) of a polyoxypropylenediamine (manufactured by Wako Pure Chemical Industries, Ltd.) having a molecular weight of 6,000 (corresponding to the molecular weight of SS described in the following Table 1).

Example 5

Production was carried out in the same manner as in Example 1, except that a polyamide-based thermoplastic elastomer having a number average molecular weight of about 45,505 was obtained by changing the amount of dodecanedioic acid used in Example 1 to 38.8 g (amount by which the molecular weight would become the molecular weight of HS described in the following Table 1), and replacing the SS used in Example 1 with 80 g (amount by which the HS/SS mass ratio would have the value described in the following Table 1) of a polyoxypropylenediamine (JEFFAMINE RT-1000 manufactured by Huntsman Corp.)

having a molecular weight of 1,000 (corresponding to the molecular weight of SS described in the following Table 1).

Example 6

Production was carried out in the same manner as in Example 1, except that a polyamide-based thermoplastic elastomer having a number average molecular weight of about 50,520 was obtained by replacing the aminododecanolactam used in Example 1 with 500 g of caprolactam, replacing the dodecanedioic acid used in Example 1 to 184 g of hexanedioic acid (amount by which the molecular weight would become the molecular weight of HS described in the following Table 1), replacing 12-aminododecanoic acid used in Example 1 with 38.7 g of adipic acid, changing the amount of PA6 (number average molecular weight 630) thus obtained to 100 g, and replacing the SS used in Example 1 with 886 g (amount by which the HS/SS mass ratio would have the value described in the following Table 1) of a polyoxypropylenediamine (manufactured by Asahi Glass Co., Ltd.) having a molecular weight of 12,000 (corresponding to the molecular weight of SS described in the following Table 1).

Example 7

Production was carried out in the same manner as in Example 1, except that a polyamide-based thermoplastic elastomer having a number average molecular weight of about 160,000 was obtained by changing the amount of dodecanedioic acid used in Example 1 to 18.2 g (amount by which the molecular weight would become the molecular weight of HS described in the following Table 1), and replacing the SS used in Example 1 with 450 g (amount by which the HS/SS mass ratio would have the value described in the following Table 1) of a polyoxypropylenediamine (manufactured by Asahi Glass Co., Ltd.) having a molecular weight of 12,000 (corresponding to the molecular weight of SS described in the following Table 1).

Example 8

Synthesis of Hard Segment (HS): PA6 (Nylon 6) Having a Number Average Molecular Weight of 3,500

570 g of ε-caprolactam manufactured by Sigma-Aldrich Company, 44 g of adipic acid, and 25 g of hexanedioic acid (amount by which the molecular weight would become the molecular weight of HS described in the following Table 2) were introduced into a reaction vessel having a volume of 2 liters and equipped with a stirrer, a nitrogen gas inlet port, and a condensation water discharge port. The air inside the vessel was sufficiently replaced by nitrogen, and then the temperature was raised to 260° C. The content was allowed to react for 4 h (hours) at an elevated pressure of 0.6 MPa. After the pressure was released, the content was further allowed to react for 2 hours under nitrogen flow, whereby a desired PA6 polymer having a number average molecular weight of about 3,500 was obtained as a white solid.

Production of Thermoplastic Elastomer 120 g of a polypropylene glycol (manufactured by Wako Pure Chemical Industries, Ltd.) having a molecular weight of 1,400 (corresponding to the molecular weight of SS described in the following Table 2) was added to 300 g of the PA6 (number average molecular weight 3,500) thus obtained, and the mixture was stirred for 5 hours at 230° C. Subsequently, 1 g of Irganox 1010 (manufactured by BASF SE) was added thereto, and the reaction was completed.

The polyamide-based thermoplastic elastomer thus obtained was pelletized, and was subjected to Soxhlet extraction in hot water for 8 hours. Subsequently, the polyamide-based thermoplastic elastomer was injection molded at 220° C., whereby a sample piece was obtained. Each measurement was performed using samples obtained by stamping out specimens from this sample piece.

Example 9

Synthesis of Hard Segment (HS): PA612 (Nylon 612) Having Number Average Molecular Weight of 3,100

207 g of dodecanedioic acid (amount by which the molecular weight would become the molecular weight of HS described in the following Table 2), 95 g of hexamethylenediamine, and 100 g of purified water were introduced into a reaction vessel having a volume of 2 liters and equipped with a stirrer, a nitrogen gas inlet port, and a condensation water discharge port. The air inside the vessel was sufficiently replaced by nitrogen, and then the temperature was raised to 280° C. The content was allowed to react for 4 hours at an elevated pressure of 0.6 MPa. After the pressure was released, the content was further allowed to react for one hour under nitrogen flow. The reaction product was taken out of the vessel and was subjected to Soxhlet extraction in ethanol for 24 hours, whereby a desired PA612 polymer having a number average molecular weight of about 3,100 was obtained as a white solid.

Production of Thermoplastic Elastomer PA612TPA

To 200 g of nylon 612 (PA612) polymer thus obtained, 129 g (amount by which the HS/SS mass ratio would have the value described in the following Table 2) of polyoxypropylenediamine (ELASTAMINE RP-2009 manufactured by Huntsman Corp., number average molecular weight: 2,000 (corresponding to the molecular weight of SS described in the following Table 2)) as the soft segment was added, and the mixture was stirred for 7 hours at 230° C. 1 g of Irganox 1010 was further added thereto, whereby a white polyamide-based thermoplastic elastomer was obtained.

Subsequently, a sample piece was produced in the same manner as in Example 1.

Example 10

Production was carried out in the same manner as in Example 1, except that a polyamide-based thermoplastic elastomer having a number average molecular weight of 120,800 was obtained by changing the amount of dodecanedioic acid used in Example 1 to 47 g (amount by which the molecular weight would become the molecular weight of HS described in the following Table 2), changing the amount of PA12 (number average molecular weight 3,100) thus obtained to 150 g, replacing the SS used in Example 1 with 580 g of a polypropylene glycol (manufactured by Asahi Glass Co., Ltd.) having a molecular weight of 12,000 (corresponding to the molecular weight of SS described in the following Table 2), and changing the reaction time at 230° C. to 8 hours.

Comparative Example 1

Production was carried out in the same manner as in Example 1, except that a polyamide-based thermoplastic elastomer having a number average molecular weight of about 70,800 was obtained by changing the reaction time at 230° C. employed at the time of producing the thermoplastic elastomer in Example 1 to 7 h (hours).

Comparative Example 2

Production was carried out in the same manner as in Example 1, except that a polyamide-based thermoplastic elastomer having a number average molecular weight of about 190,000 was obtained by changing the reaction time at 230° C. employed at the time of producing the thermoplastic elastomer in Example 7 to 10 h (hours).

Comparative Example 3

Production was carried out in the same manner as in Example 1, except that a polyamide-based thermoplastic elastomer having a number average molecular weight of about 28,750 was obtained by changing the amount of the dodecanedioic acid used in Example 3 to 19.5 g (amount by which the molecular weight would become the molecular weight of HS described in the following Table 2), and changing the reaction time at 230° C. employed at the time of producing the thermoplastic elastomer in Example 3 to 2 h (hours).

Comparative Example 4

Production was carried out in the same manner as in Example 1, except that a polyamide-based thermoplastic elastomer having a number average molecular weight of about 64,900 was obtained by changing the reaction time at 230° C. employed at the time of producing the thermoplastic elastomer in Example 1 to 6 hours and 45 minutes (a time period shorter by 15 minutes than that of Comparative Example 1).

Comparative Example 5

Production was carried out in the same manner as in Example 5, except that a polyamide-based thermoplastic elastomer having a number average molecular weight of about 38,320 was obtained by changing the reaction time at 230° C. employed at the time of producing the thermoplastic elastomer in Example 5 to 4 hours and 40 minutes (a time period shorter by 20 minutes than that of Example 5).

Comparative Example 6

Production was carried out in the same manner as in Example 4, except that a polyamide-based thermoplastic elastomer having a number average molecular weight of about 180,000 was obtained by changing the reaction time at 230° C. employed at the time of producing the thermoplastic elastomer in Example 4 to 10 hours (a time period longer by 5 hours than that of Example 4).

Calculation of Numbers of Repeating Units of HS and SS

The numbers of repeating units of HS and SS (average values) were calculated by the method of measuring a molecular weight using NMR as described above. The results are presented in Table 1 and Table 2.

[Evaluation]

The following items were evaluated using the thermoplastic elastomers obtained in the Examples and the Comparative Examples. The results are presented in Table 1 and Table 2.

(Elastic Modulus)

The tensile modulus as defined by JIS K7113:1995 (unless particularly stated otherwise, the "elastic modulus" used in the present specification means tensile modulus) was measured. Next, for the measured values of elastic modulus obtained by the measurement method described above, relative values were determined by performing calculation based on the value of Comparative Example 1, the relative value of which is set to be 100. A higher elastic modulus is more preferable.

(Elongation at Break, Eb)

The tensile elongation at break Eb as defined by JIS K7113:1995 was measured. Next, for the measured values of elongation at break obtained by the measurement method described above, relative values were determined by performing calculation based on the value of Comparative Example 1, the relative value of which is set to be 100. A larger value of Eb indicates superior fracture resistance property (durability), and as a reference, if Eb is lower by 10% or more than that of Comparative Example 1, the fracture resistance property (durability) is regarded as inferior.

(Low Loss Property)

A specimen stamped out from a sample piece having a thickness of 2 mm into a disc shape having a diameter of 8 mm was used for the measurement. Loss tangent (tan δ) was measured using a viscoelasticity analyzer (manufactured by Rheometrics, Inc.) under conditions of temperature of 30° C., a strain of 1%, and a frequency of 20 Hz. For the measured values of tan δ obtained by the measurement method described above, relative values were determined by performing calculation based on the value of Comparative Example 1, the relative value of which is set to be 100. A smaller value indicates superior low loss property.

TABLE 1

| | Example 1 | Example 2 | Example 3 | Example 4 | Example 5 | Example 6 | Example 7 |
|---|---|---|---|---|---|---|---|
| Elastomer | TPA | TPA | TPA | TPA | TPA | TPA | TPA |
| PA | 12 | 12 | 12 | 12 | 12 | 6 | 12 |
| Molecular weight of HS | 3,900 | 6,000 | 7,800 | 12,000 | 3,790 | 630 | 8,000 |
| Molecular weight of SS | 2,000 | 3,000 | 4,000 | 6,000 | 1,000 | 12,000 | 12,000 |
| Number of repeating units | 9.5 | 6 | 5 | 4 | 9.5 | 4 | 8 |
| HS/SS mass ratio in repeating unit | 66/34 | 67/33 | 66/34 | 67/33 | 79/21 | 5/95 | 40/60 |
| Overall molecular weight | 56,050 | 54,000 | 59,000 | 72,000 | 45,505 | 50,520 | 160,000 |
| Elastic modulus | 105 | 112 | 125 | 120 | 130 | 101 | 118 |
| Elongation at break, Eb | 99 | 98 | 98 | 97 | 100 | 97 | 100 |
| Low loss property | 97 | 95 | 94 | 90 | 88 | 78 | 95 |

TABLE 2

|  | Example 8 | Example 9 | Example 10 | Comparative Example 1 | Comparative Example 2 | Comparative Example 3 | Comparative Example 4 | Comparative Example 5 | Comparative Example 6 |
|---|---|---|---|---|---|---|---|---|---|
| Elastomer | TPA | TPA | TPA | TPA | TPA | TPA | TPA | TPA | TPA |
| PA | 6 | 612 | 12 | 12 | 12 | 12 | 12 | 12 | 12 |
| Molecular weight of HS | 3,500 | 3,100 | 3,100 | 3,900 | 8,000 | 7,500 | 3,900 | 3,790 | 12,000 |
| Molecular weight of SS | 1,400 | 2,000 | 12,000 | 2,000 | 12,000 | 4,000 | 2,000 | 1,000 | 6,000 |
| Number of repeating units | 10 | 9 | 8 | 12 | 9.5 | 2.5 | 11 | 8 | 10 |
| HS/SS mass ratio in repeating unit | 71/29 | 61/39 | 21/79 | 66/34 | 40/60 | 65/35 | 66/34 | 79/21 | 67/33 |
| Overall molecular weight | 49,000 | 45,900 | 120,800 | 70,800 | 190,000 | 28,750 | 64,900 | 38,320 | 180,000 |
| Elastic modulus | 128 | 128 | 127 | 100 | 118 | 129 | 101 | 169 | 118 |
| Elongation at break, Eb | 102 | 101 | 103 | 100 | 100 | 89 | 99 | 87 | 74 |
| Low loss property | 97 | 96 | 97 | 100 | 101 | 93 | 100 | 92 | 101 |

As can be seen from Table 1 and Table 2, the Examples in which the number of repeating units of the hard segment (HS) and the soft segment (SS) in one molecular chain is from 2 to 10, and the number average molecular weight is from 45,000 to 160,000, can achieve both an excellent elastic modulus and low loss property while having durability, compared to the Comparative Examples in which at least one of these requirements is not satisfied.

The entire disclosure of Japanese Patent Application No. 2014-199160 is incorporated herein by reference.

All publications, patent applications, and technical standards mentioned in this specification are herein incorporated by reference to the same extent as if each individual publication, patent application, or technical standard was specifically and individually indicated to be incorporated by reference.

REFERENCE NUMERALS

- 10: tire
- 12: bead portion
- 16: crown portion (outer periphery)
- 17: tire case (tire frame)
- 18: bead core
- 20: rim
- 21: bead seat
- 22: rim flange
- 24: sealing layer (sealing section)
- 26: reinforcing cord (reinforcing cord member)
- 28: reinforcing cord layer
- 30: tread
- D: diameter of reinforcing cord (diameter of reinforcing cord member)
- L: depth of embedding of reinforcing cord (depth of embedding of reinforcing cord member)

The invention claimed is:

1. A tire comprising a tire frame that is formed of a resin material and has a circular form, wherein the resin material comprises a thermoplastic elastomer having a structure including a hard segment (HS) and a soft segment (SS), which repeat alternately, in which a number of repeating units in one molecular chain is from 2 to 10, each of the repeating units being a pair of the hard segment (HS) and the soft segment (SS), the thermoplastic elastomer having a number average molecular weight of from 45,000 to 160,000.

2. The tire according to claim 1, wherein the number of the repeating units is from 2 to 8.

3. The tire according to claim 1, wherein the number of the repeating units is from 2 to 6.

4. The tire according to claim 1, wherein a mass ratio (HS/SS) of the hard segment (HS) to the soft segment (SS) in the repeating units is from 20/80 to 80/20.

5. The tire according to claim 1, wherein the thermoplastic elastomer is at least one selected from a polyurethane-based thermoplastic elastomer, a polyamide-based thermoplastic elastomer, and a polyester-based thermoplastic elastomer.

6. The tire according to claim 1, wherein the thermoplastic elastomer is a polyamide-based thermoplastic elastomer.

7. The tire according to claim 1, wherein the thermoplastic elastomer has a number average molecular weight of from 100,000 to 160,000.

8. The tire according to claim 1, wherein the tire frame comprises:
   a pair of bead portions;
   side portions that each outwardly extend from the bead portion in the tire radial direction; and
   a crown portion that connects the tire-radial-direction outer end of one side portion and the tire-radial-direction outer end of the other side portion.

9. The tire according to claim 8, wherein an annular bead core is embedded in each of the bead portions.

10. The tire according to claim 8, wherein a reinforcing cord is embedded in the crown portion of the tire frame.

* * * * *